(No Model.)
A. COCHRAN.
PIPE COUPLING.
No. 428,076. Patented May 20, 1890.
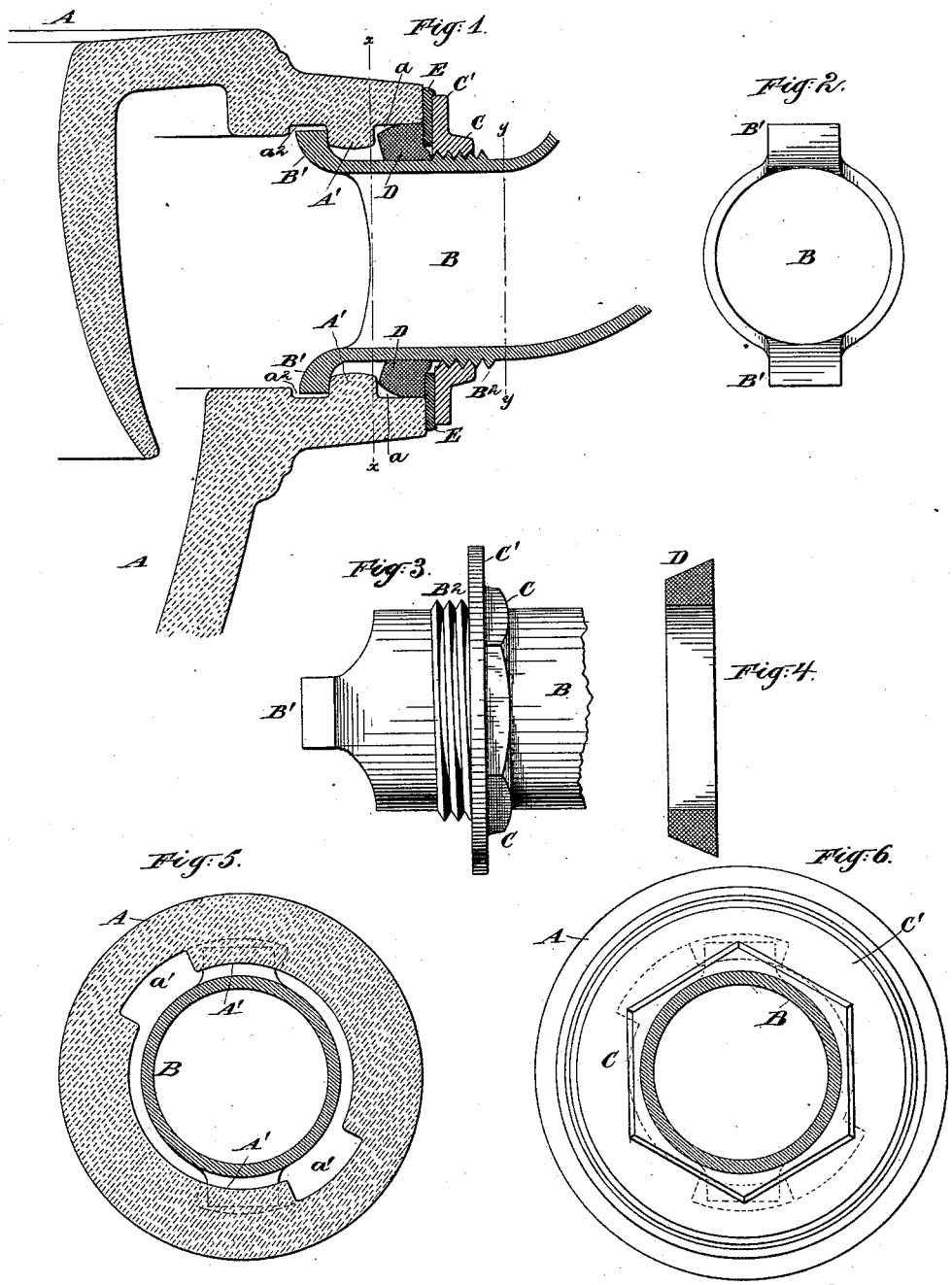

UNITED STATES PATENT OFFICE.

ANDREW COCHRAN, OF TRENTON, NEW JERSEY.

PIPE-COUPLING.

SPECIFICATION forming part of Letters Patent No. 428,076, dated May 20, 1890.

Application filed October 7, 1889. Serial No. 326,246. (No model.)

*To all whom it may concern:*

Be it known that I, ANDREW COCHRAN, of Trenton, in the county of Mercer and State of New Jersey, have invented a certain new and useful Improvement in Pipe-Couplings, of which the following is a specification.

The invention is intended more particularly for joining the metallic flushing-pipe to the crockery wash-bowl of a water-closet, and I will describe it as thus applied. It is not practicable to produce screw-threads in the crockery; but there is ample room for a cavity of considerably-larger diameter than the pipe. The material is easily worked while in its plastic state, and no difficulty is experienced in revolving a tool to cut a circular hole, or to produce a hole which shall be completely circular at the top or outer end and shall form segments of a circle about the same size at the bottom or inner end, that constitute internal projections, which I will term "ledges," at the mid-depth. This is the form required for my invention. I produce screw-threads on a thick portion of the metallic pipe, a considerable distance back from the end, and I provide the end with a number of arms corresponding to the number of engaging-ledges in the cavity. I insert the pipe with the arms in such position that they move freely past the engaging-ledges. When the pipe is fully inserted and its extreme end is at or near the bottom of the recess, I impart a twisting motion, which turns it partially around on its axis and engages the arms under the retaining-ledges. This constitutes a reliable locking of the parts together, the construction of this part being what is sometimes known as a "bayonet-joint." In the annular unobstructed cavity which is left around the pipe at the upper or outer end I apply a ring of soft vulcanized rubber. This ring is sufficiently narrow at the lower side to enter easily into the recess, and it is pushed down like a cork into a bottle. The upper edge of this ring should be so wide as to fill the cavity tightly. I prefer to give it a width so much in excess of the cavity into which it is to be received that considerable force is required to drive it down. The compression to which it is thus subjected in this act causes it to apply tightly against the crockery on the outside of the annular cavity and against the tube on the inside thereof. The portion of the tube against which the packing-ring of soft rubber is thus pressed is preferably smooth; but immediately above or outside of this is an enlarged portion of the pipe, which is screw-threaded and receives a nut which is formed with a broad bearing at the bottom, adapted, when turned by a proper wrench, to press fairly on the rubber and drive it home and hold it.

In what I esteem the preferable form of the invention the nut is provided with a lip or flange which extends out considerably beyond the recess, and consequently beyond the rubber packing. I put under such lip a yielding washer of rubber or leather. When the nut thus equipped is screwed home, it compresses the packing and makes a tight joint in the cavity, and also presses fairly on the washer lying on the plane outer face of the crockery exterior to the recess and makes a tight joint between that and the flange of the nut. This construction makes an eminently tight union, and also supports the pipe very reliably against any force tending to deflect it up or down or to one side. It is a union which can be easily opened and closed again when occasion shall require for repairs or for any other purpose. To disconnect the coupling, the bowl being liberated from its fastening on the floor and drawn forward a little by the bending of the pipe, the nut is turned in the direction to relieve the packing from pressure, and the bowl may then be partially revolved in the direction to disengage the arms from under the retaining-ledges. Then the parts may be separated by a direct pull.

The accompanying drawings form a part of this specification and represent what I consider the best means of carrying out this invention.

Figure 1 is a central vertical section showing the joint complete. Fig. 2 is an end view of the pipe alone. Fig. 3 is a side view of the pipe with the nut in position before applying the parts together. Fig. 4 is a central cross-section of the rubber ring. Fig. 5 is a section on the line $x$ $x$ in Fig. 1. Fig. 6 is a section on the line $y$ $y$ in Fig. 1.

Similar letters of reference indicate corresponding parts in all the figures where they appear.

A is the crockery bowl, certain portions being designated, when necessary, by supernumerals, as A'. A recess is provided to receive the flushing-pipe, which is circular at the exterior or outer face and partially circular at the bottom or inner end, with strong intervening ledges serving as locking-ledges, which ledges extend only a portion of the way around, leaving spaces between, through which the stout arms on the pipe may be passed.

B is a portion of the metallic flushing-pipe. It is preferably made of brass. It is represented as bent at about the curve ordinarily required to effect the junction between the horizontal end which enters the bowl and the vertical pipe which brings water down from a tank or other provision above. (Not shown.) The end which enters the bowl is provided with two arms, spreading, as indicated by B' B'. At a sufficient distance from the end is a thickened portion $B^2$, on which a screw-thread is cut.

C is a hexagonal nut matching on these screw-threads and provided at its face, which is presented toward the bowl, with a broad flange C'. The recess $a$, which receives the packing, is circular, or as nearly such as can be produced in such ware, the hole being exactly circular in the biscuit, and being usually but slightly warped in the burning. The rubber readily adapts itself to the slight inequalities, and its size is such that when forcibly compressed by the turning of the nut C it is pressed edgewise between the tube and the exterior of the recess $a$, and thus makes a water-tight joint and also a strong and elastic mechanical support.

The arms B' B' are inserted under the locking-ledges A' by being moved inward through spaces $a'$ between these locking-ledges, and then being moved circumferentially in recesses $a^2$ under the locking-ledges, and thus constituting a bayonet-joint fastening.

In what I esteem the most complete form of the invention a washer E, of leather or soft rubber, is applied under the flange C', lying between it and the packing-ring D. This washer also applies between the outer portion of the flange C' and the adjacent face of the crockery. It makes a further water-tight and mechanically-elastic connection.

Parts of the invention can be used without the whole. I can dispense with the soft washer E and with the flange C', depending on the nut C alone to effect the compression, and on the elastic packing-ring D, forced thereby into the annular recess $a$, to give the requisite mechanical support and to form the water-tight joint. I prefer the whole as shown.

Modifications may be made without departing from the principle or sacrificing the advantages of the invention. Instead of two arms B' B', I can use three or more; but in such case there should be a corresponding number and arrangement of the recesses between the locking-ledges, through which the arms B' are moved when the pipe is inserted into the recess. The turning or partial revolution of the pipe relatively to the bowl, or of the bowl relatively to the pipe, will be about the same in case there are more than two arms.

I give the form shown to the end of the pipe, making it shorter between the arms than at the points where the arms extend outward. This economizes the metal and does not appreciably detract from the strength, tightness, or steadiness of the connection. This shortening of the pipe between the arms can be omitted, if preferred in any case.

I can fill the remaining spaces in the recess $a'$ $a^2$ with cement, if desired in any case. Such cement, if applied at all, should be introduced after the pipe is properly inserted and partially revolved and before the rubber ring D is forced in. It is important that the cement does not fill the circular recess $a$, which is to receive the rubber.

I claim as my invention—

1. In a pipe-coupling, the bowl or other engaging object A, having an unbroken circular recess $a$, in combination with a pipe B, having arms B', and with an elastic packing-ring D, forced into said recess, and with the locking-ledges A', adapted to receive and retain the arms B', as herein specified.

2. In a pipe-coupling, the pipe B, having arms B' B', and a screw-threaded portion $B^2$, in combination with the nut C, elastic ring D, and with a bowl or other object having a socket with internal locking-ledges A', under which the arms B' may be engaged, and having an annular recess $a$ at the face, in which the packing-ring D may be held and radially compressed between the pipe and the exterior of such recess, combined and arranged to serve substantially as herein specified.

3. The pipe-coupling described, having the arms B' B', and a screw-threaded portion $B^2$ on the pipe B, the flange C' on the nut C, the elastic packing-ring D, and soft washer E, in combination with each other and with a water-closet bowl or other connecting part having an annular recess $a$, in which the packing-ring D is compressed radially, and also having locking-ledges A', recesses $a'$ between them, through which the arms B' B' may be passed, and recesses $a^2$ under the locking-ledges, into which the arms B' B' may be moved, all arranged for joint operation substantially as herein specified.

In testimony whereof I have hereunto set my hand, at Trenton, New Jersey, this 28th day of September, 1889, in the presence of two subscribing witnesses.

ANDREW COCHRAN.

Witnesses:
 EDWARD C. STOVER,
 WILLIAM J. CROSSLEY.